United States Patent [19]

Keeling

[11] Patent Number: 5,642,524

[45] Date of Patent: Jun. 24, 1997

[54] METHODS FOR GENERATING N-DIMENSIONAL HYPERCUBE STRUCTURES AND IMPROVED SUCH STRUCTURES

[76] Inventor: John A. Keeling, 2868 S. Heather Gardens Way, #303, Aurora, Colo. 80014-3621

[21] Appl. No.: 314,726

[22] Filed: Sep. 29, 1994

[51] Int. Cl.$^6$ .................................................. G06F 13/00
[52] U.S. Cl. ............... 395/800; 395/200.01; 364/940.67; 364/DIG. 1
[58] Field of Search ............................. 395/200.01, 800; 364/DIG. 1, 940.67

[56] References Cited

U.S. PATENT DOCUMENTS

| | | | |
|---|---|---|---|
| 5,170,482 | 12/1992 | Shu et al. | 395/200 |
| 5,212,773 | 5/1993 | Hillis | 395/200 |
| 5,278,778 | 1/1994 | Akimoto et al. | 364/578 |

Primary Examiner—Alyssa H. Bowler
Assistant Examiner—Dzung C. Nguyen
Attorney, Agent, or Firm—Harry M. Weiss; Jeffrey D. Moy; Harry M. Weiss & Associates, P.C.

[57] ABSTRACT

A method of generating designs for N-dimensional hypercube structures along with the resulting structures, wherein the positive integer N defines the binary space dimension of the representative hypercube structure. The required N-dimensional hypercube is generated from the (N−1) dimensional hypercube. The procedure consists of applying a 1-dimensional extension hypercube to each of the (N−1) first plurality of nodes, thus positively generating a corresponding second plurality at both the 0 and 1 endpoints of the extension operator hypercube. Essentially, both (N−1) hypercubes when properly coupled in closed-loop fashion, together generate the required N-dimensional hypercube. The complementary connections of each (N−1) hypercube provide a method and structure for connection and incidence-relation among nodes. The method also includes a partition/coordinate system, whereby each node of the N-dimensional hypercube is identified and located relative to the space it occupies.

1 Claim, 11 Drawing Sheets

METHODS FOR GENERATING N-DIMENSIONAL HYPERCUBE STRUCTURES AND IMPROVED SUCH STRUCTURES

BACKGROUND OF THE INVENTION

1. Field of the Invention

This invention relates generally to binary logic space structures and network designs, and, more specifically, to improved methods for generating N-dimensional hypercube structures and the resulting improved such structures. The method is based upon the fact that the integer 2 raised to the exponent N (the power set) contains all of the subsets (points) of the given N-dimensional binary space.

2. Description of the Related Art

Many computer scientists are today attempting to implement several hundred, and even several thousand, processors in a parallel manner in order to increase the computational power of computers. One of the problems in this field is how to connect all of these processors or computers. It would be highly impractical to take thousands of computers and have each one directly connected to every other one of the thousands of computers. Accordingly, computer scientists have been looking for structures to permit hooking up several thousand computers thereon and to further permit efficient communication between each of the computers.

Modern technologies, such as digital communication systems, whose foundations are grounded on logic, probability and information/communication theories, have developed more systematically under the influence of widespread application of pertinent space concepts. The method of generating cubical logic space structures will provide network designers and researchers a deeper, broader vision and a consequent appreciation of the space structure requirements to be met in obtaining minimum-complexity solutions to their projected systems. They will have a clear understanding of the transformation from a given state to that of a projected state because both states are progressively and systematically defined.

Therefore, there has existed a need to provide a method for generating efficient N-dimensional hypercube structures and for efficient such structures. The method disclosed herein will illustrate a rational and efficient manner of generating the composite systems, whose synthesis possess the properties and power to satisfy the needs of a development of this nature.

OBJECTS OF THE INVENTION

In accordance with one embodiment of this invention, it is an object of this invention to provide a method for generating N-dimensional hypercube structures and improved designs therefor.

It is another object of this invention to provide unique N-dimensional hypercube structures and improved designs therefor.

It is a further object of this invention to provide unique N-dimensional hypercube structures and networks for use in improved communications systems.

It is another object of this invention to provide unique, N-dimensional hypercube structures and networks for use in improved parallel computer systems.

It is yet another object of this invention to provide unique N-dimensional hypercube structures that are useful for visualizing and improving useful designs, and thereby also facilitating the teaching of design techniques by better comprehension of the complex properties of high-dimensional binary logic, and also thereby improving teaching multi-dimensional logic.

SUMMARY OF THE INVENTION

According to the foregoing objectives, this invention describes an improved method for generating an improved design for an N-dimensional hypercube structure of 2-to-the-Nth-power component nodes, the nodes being efficiently locatable and the node connections being efficiently incidence-related, comprising the steps of generating two original nodes and defining each of the two original nodes (for N=1) by a first binary variable and its complement, respectively; generating an additional node for each original node, each additional node being coupled to a corresponding original node; defining each such original node by such first binary variable as a first binary digit and the complement of a new binary variable as a next binary digit; defining each such additional node by the value of the first binary digit of the corresponding coupled original node as the first binary digit of said additional node and a new binary variable as a next binary digit, thus establishing, for N=2, a first plurality of nodes, each of such first plurality of nodes having a different value specified by 2 binary variables; and, in integer steps from N=3 for increasing values of N, generating a second plurality of (N−1) nodes and having each node of such second plurality of (N−1) nodes coupled to a corresponding node of such (N−1) first plurality of nodes; defining each node of such (N−1) first plurality of nodes both with the prior value already specified by (N−1) binary variables as first binary digits and the complement of a new binary variable as a next binary digit; defining each node of such second plurality of nodes both with such prior value specified by such (N−1) binary variables from such corresponding node of such first plurality of nodes and with such new binary variable as a next binary digit; and defining both such first plurality of nodes and such second plurality of nodes together as a new first plurality of nodes wherein essentially each of such new first plurality of nodes bears a unique name consisting essentially of a binary number having a string of N binary digits; and repeating such steps for the next increased value of integer N, so long as desired.

There is also provided, in such method for generating an improved design for an N-dimensional hypercube structure of 2-to-the-Nth-power component nodes, the step of generating "cubical core" partitioned spaces and subspaces (as defined hereinafter) within which to locate said nodes with reference to the nodes of the 3-dimensional hypercube for eight space partitions and corresponding subspace partitions with reference to the nodes of each hypercube as increased in increments of 3 dimensions. Also provided in such method is the step of directly connecting essentially each (first) such node to each of about N other (second) such nodes, such N other (second) nodes being each other (second) such node bearing a such name selected from the class of such names consisting essentially of: such names each comprising the string of N binary digits uniquely denoting such each (first) such node but wherein exactly one of such N binary digits is changed to its complement digit. Also provided in such method is the step of partitioning the logical space of such hypercube structure by logical planes dividing such space into cubical coordinate spaces and subspaces, each such node being locatable at the intersection of the logical planes arising from the N binary variables identifying the binary-digital name of such node.

Also, according to the present invention, there is provided a method for generating an improved design for an N-dimensional hypercube structure of 2-to-the-Nth-power component nodes, the nodes of such structure being efficiently locatable and the node connections of such structure being efficiently incidence-related, comprising the steps of: denoting essentially each such node of such structure by a unique name consisting essentially of a binary number having a string of N binary digits; and directly connecting essentially each (first) such node to each of about N other (second) such nodes, such N other (second) nodes being each other (second) such node bearing a said name selected from the class of such names consisting essentially of such names each comprising the string of N binary digits uniquely denoting such each (first) such node but wherein exactly one of such N binary digits is changed to its complement digit.

The present invention also provides a large N-dimensional hypercube network of component nodes, forming identifiable incidence relations among the nodes of such large network, comprising such nodes numbering about 2-to-the-Nth-power, essentially each such node bearing a unique name consisting essentially of a binary number having a string of N binary digits, and essentially each (first) such node being directly connected to each of about N other (second) such nodes, said N other (second) nodes being each other (second) such node bearing a such name selected from the class of such names consisting essentially of such names each comprising the string of N binary digits uniquely denoting such each (first) such node but wherein exactly one of such N binary digits is changed to its complement digit. Such network is provided also wherein N is a number larger than 6. And such network is provided among computing systems in a such network.

Additionally, the present invention provides a method for generating an improved design for an N-dimensional structure wherein a numerical value of N defines a logical dimension for the N-dimensional structure, comprising the steps of: establishing each node of a first plurality of nodes of an (N–1) dimensional structure with a unique value specified by (N–1) binary variables; generating a second plurality of nodes and having each node of such second plurality of nodes coupled to a corresponding node of such first plurality of nodes; defining each node of such first plurality of nodes both with such unique value specified by such (N–1) binary variables and with a value specified by a complement of a new binary variable; and defining each node of such second plurality of nodes both with such unique value specified by such (N–1) binary variables from such corresponding node of such first plurality of nodes and with such new binary variable. Also provided is such method wherein such (N–1) dimensional structure is a hypercube. Additionally provided is such method wherein such N-dimensional structure is a hypercube. And there is provided also such method wherein such N-dimensional structure comprises a total number of nodes essentially equal to 2 raised to the Nth power.

Furthermore, this invention provides such method wherein each node of such total number of nodes is uniquely defined by N binary variables. And it provides such method wherein such (N–1) dimensional structure is a complement of such N-dimensional structure. And it also provided such method wherein such numerical value of N is a positive integer. Further provided is such method wherein each node of such first plurality of nodes is coupled to at least one node of such first plurality of nodes. And it provides such method wherein such first plurality of nodes are coupled together in a closed loop manner. Furthermore, such method is provided wherein each node of such second plurality of nodes is coupled to at least one node of such second plurality of nodes. And such method is further provided wherein such second plurality of nodes are coupled together in a closed loop manner. Also provided is such method wherein each node of such first plurality of nodes is directly connected with one node of such second plurality of nodes and indirectly connected with essentially each node of such second plurality of nodes. Also, this invention provides such method wherein each node of such N-dimensional structure has N-connections therefrom. This invention also provides the N-dimensional hypercube structures generated by such method.

Moreover, there is provided according to the present invention a method for generating an improved design for an N-dimensional structure wherein a numerical value of N defines a logical dimension for the N-dimensional structure, comprising the steps of: establishing each node of a first plurality of nodes of an (N–1) dimensional structure with a unique value specified by (N–1) binary variables; generating a second plurality of nodes and having each node of such second plurality of nodes coupled to a corresponding node of such first plurality of nodes; defining each node of such first plurality of nodes both with such unique value specified by such (N–1) binary variables and with a value specified by a complement of a new binary variable; defining each node of such second plurality of nodes both with such unique value specified by such (N–1) binary variables from such corresponding node of such first plurality of nodes and with such new binary variable; such N-dimensional structure comprising a total number of nodes equal to 2 raised to the Nth power; coupling each node of such first plurality of nodes to at least one other node of such first plurality of nodes in such manner that such first plurality of nodes are coupled together in a closed loop manner; coupling each node of such second plurality of nodes to at least one other node of such second plurality of nodes in such manner that such second plurality of nodes are coupled together in a closed loop manner; and directly connecting each node of said first plurality of nodes to one node of such second plurality of nodes and thereby forming an indirect connection with each node of such second plurality of nodes. Also provided are the N-dimensional hypercube structures generated by such method.

Even additionally, this invention provides a method of generating N-dimensional hypercube structures wherein N is any given positive number defining a logical dimension for the N-dimensional hypercube structures, comprising the steps of: locating each node of a first plurality of nodes of any desired dimensional hypercube structure representative of a selected logical dimension corresponding to such first plurality of nodes of such desired dimensional hypercube structure; and generating a higher level logical dimension which is increased by one logical dimension level above such selected logical dimension by creating a second plurality of nodes and having each node of such second plurality of nodes coupled to a corresponding node of such first plurality of nodes. Also provided are the N-dimensional hypercube structures generated by such method.

It is particularly pointed out that, in accordance with one embodiment of this invention, a method for generating an N-dimensional binary logic hypercube structure wherein exponent N, to which 2 is raised, will represent the dimension of the space under consideration. Also, the generated hypercube structure will be a true representation of the complete assembly of its subsets. In addition, each N-dimensional hypercube synthesis will consist of generating, firstly, a type of structure which we will denote as being the "cubical core" space model and, secondly, an extension of the "cubical core" model, incorporating all incidence relationships between cubes and called the "incidence-preserving" hypercube. Thirdly, the incidence relations for each element of the binary space will be shown to follow an iteration technique that generates the set of incidence modes for a particular element. Finally, the hypercube core structure, as developed, will be shown to lend itself to and thereby facilitate a partition/coordinate system which can be impressed upon the structure to identify and locate each node relative to the space and to each other node.

The foregoing and other objects, features and advantages of the invention will be apparent from the following, more particular, description of the preferred embodiments of the invention, and illustrated in the accompanying drawings.

BRIEF DESCRIPTION OF THE DRAWINGS

FIG. 2 is a plan view of the 1-dimensional hypercube structure.

DESCRIPTION OF THE PREFERRED EMBODIMENTS

Referring to the Figures, it should be pointed out that the letters A, B, C, D, E, and F represent binary variables. Therefore, each variable is also shown with a bar, such as $\overline{A}, \overline{B}, \overline{C}, \ldots \overline{F}$, the standard representation of the complement or "NOT" of the binary variable. $\overline{A}$ may also within this description be written as ANOT. Of course, it will be noted that for higher-dimensional hypercube structures, more letters, such as G, H, I ..., would be required. As an alternative, the dyadic sequence of ordinal type designating method, such as (01000) and (11100) of 5-dimension [rather than ($\overline{A}B\overline{C}\overline{D}E$) and ($AB\overline{C}\overline{D}\overline{E}$)], employing the numbers 0, 1 is most generally preferred by those proficient in the binary-logic field.

Figure 1:
FIG. 1 is the zero-dimensional hypercube structure, the "null set."

Referring to FIG. 1, the example of the 0-dimensional hypercube structure is shown as the dimension-less point $\emptyset$, which is logically defined as the "empty set" containing the complement of "every element," consisting of nothing. As above, the raising of 2 to the exponent 0, results in the 0-dimensional space of one element $\emptyset$, the "null set."

Referring to FIG. 2, the example of the 1-dimensional hypercube is shown as a straight link connecting two endpoint nodes labelled A-NOT and A, as optionally 0 and 1. Again, note that 2 raised to the 1st power results in two nodes. Accordingly, the exponent of 2 is 1, the dimension of the hypercube space.

The method of generating the N-dimensional binary logic hypercube structures begins by generating the initial (N−1) "cubical core" hypercube. This "cubical core" hypercube structure results from repetitively applying the following procedure:

Upon each node of the first plurality of nodes of an (N−1) dimensional hypercube structure (which first plurality of nodes will be a closed loop if generated by the method herein described), we apply the O endpoint of the 1-dimension extension hypercube. This process generates two complementary hypercubes of the (N−1) dimension, where the nodes of the second plurality at the 1 endpoint of the connecting 1-dimensional hypercubes are correspondingly [to the (N−1) dimensional hypercube coupling] coupled together in a closed loop manner. Together the two complementary hypercubes of (N−1) dimension generate the required N-dimensional hypercube.

Figure 3:
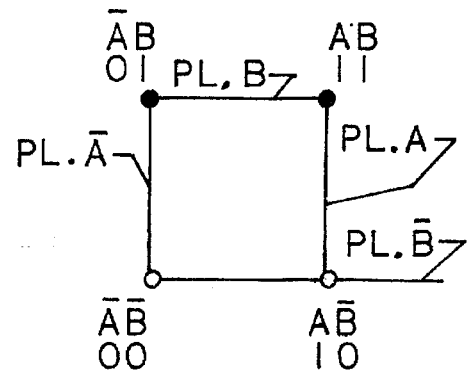
FIG. 3 is a plan view of a 2-dimension hypercube structure.

In particular, referring to FIG. 3, the two 1-dimensional hypercubes with endpoints 0 and 1, shown as the vertical legs of the rectangle, when applied to the (N−1) dimensional hypercube, shown as the bottom segment of the rectangle, positively generates two (N−1) hypercubes; one at the 0 endpoints and one at the 1 endpoints of the joining 1-dimensional hypercubes. The first plurality of nodes at the originating (N−1) hypercube namely 0 and 1 become the second plurality of nodes, which are positively generated at the 1 endpoints, become the two element sequences (0111).

As a result of this process, we see that the 2-dimensional rectangular hypercube, the required N-dimensional hypercube, has been generated by the two complementary (N−1) 1-dimensional hypercubes. The four elements of the space are clearly shown to be coupled in the prescribed closed loop manner.

Additionally, we note (with reference to FIG. 3) that there is impressed on the rectangular 2-dimensional hypercube, a partition/coordinate system. This procedure identifies and locates the four resulting nodes of the binary space residing at the intersections of the four planes, namely, Plane ANOT, Plane A, Plane BNOT and Plane B. Node (00) appears at the intersection of Planes ANOT and Plane BNOT. Node (10) appears at the intersection of Plane A and BNOT. Node (01) resides at the intersection of Planes ANOT and Plane B and finally, node (11) resides at the intersection of Planes A and Plane B.

Referring back to FIG. 2, we can reasonably apply the above methodology to the 1-dimensional hypercube generation. We note that the 0 and 1 endpoints of the 1-dimensional linear hypercube have been generated from the 0-dimensional hypercube, namely the null or empty hypercube.

Finally, as a result of the previously applied technologies and the descriptions hereinafter, we see that each node of a hypercube structure or complex, generated according to this preferred embodiment of the present invention, is incidence-related to its complement coordinate-wise. Therefore, we can initiate a permutation type procedure on each element to generate the incidence relationships pertinent to each node. We proceed as follows:

At each node of a hypercube complex, we begin at the first coordinate member, being the first digit of the binary digit name of the node, and change its value to the complementary value, while holding all other nodal values constant. We then perform the same task on the second coordinate-wise member (being the second digit of the binary digit name of the node) and so on until all coordinate-wise members of the node have been permuted. As an example, we wish to generate the 5 incidence nodes for the given node (10010): As a result of the above method we obtain, (00010), (11010), (10110), (10000) and (10011). This ability to generate the incidence-related nodes (the other nodes to which each node is connected) for each element of the hypercube complex, becomes extremely important when planning and developing the high numbered N-dimensional incidence-preserving hypercube structures.

Figure 4:
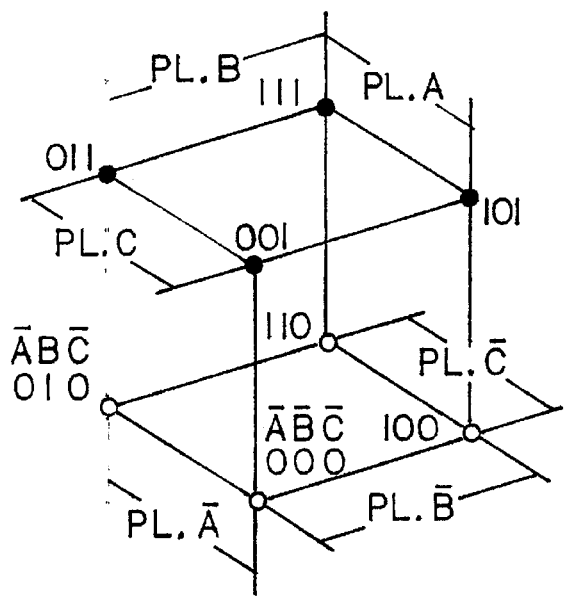
FIG. 4 is a perspective view of a 3-dimensional hypercube structure.

Referring to FIG. 4, the 3-dimensional hypercube is shown as a cube. Also, the bottom face of the cube corresponds to the rectangular 2-dimensional hypercube of FIG. 3. It will be shown, that the 3-dimensional hypercube, the cube, is generated from the 2-dimensional hypercube, the rectangle. This result further reinforces the fact that the N-dimensional hypercube is generated from the (N−1) hypercube, as previously demonstrated.

As noted above, the rectangular base of the cube will be the (N−1) dimensional hypercube on which is operated to form the N-dimensional cubical hypercube. The method proceeds as follows:

Upon the four nodes forming the rectangular base, the first plurality of nodes 00, 10, 01, 11 are applied the four 1-dimensional vertical extension hypercubes with the 0 endpoint placed at the bottom rectangle. This process generates the second plurality of nodes at the base rectangle, namely, 000, 100, 010 and 110. At the same time, at the 1 endpoint of the vertical 1-dimensional hypercube the corresponding second plurality of nodes are generated from the first plurality, namely, 001, 101, 011, 111, thus forming the 8 required nodes of the cubical 3-dimensional hypercube.

In addition, the intersection of the 6 planes (PL's as shown in FIG. 4) provide the identity and location of the 8 nodes as follows: The intersection of PL's ANOT BNOT CNOT, identify and locate the hypercube node ANOT BNOT CNOT (000). The intersection of PL's A BNOT CNOT identify and locate the nodes A BNOT CNOT (100) and so forth for each remaining node. Incidentally, the node at reference 000 in FIG. 4 is the corresponding node 00 at FIG. 3 and represents the position of the first plurality of nodes transferred from the 2-dimensional hypercube of FIG. 3.

Again, finally, the task of permuting the individual nodes coordinate-wise produces the incidence relations on each node relative to itself and the other nodes. Also, as an example: the node (011) produces (111), (001) and (010) and is connected thereto as indicated on FIG. 4.

Incidentally, this 3-dimensional hypercube, a "cubical core", represents the starting point from which all future development of binary logic space structures will proceed. Furthermore, and most importantly, it will be demonstrated that the entire binary logic space can be partitioned into the eight basic coordinate regions of the cube, namely, ANOT, A; BNOT, B; and CNOT, C.

All the additional space extensions, such as DNOT, D; ENOT, E—NNOT, N occur as subspaces of the uniquely partitioned entire space. It is this method of "cubical core" development of each subspace that forms the framework on which the system of N-dimensional hypercube structures are progressively generated.

Additionally, the technique of partitioning by coordinate nodal identification and location—as well as the operation of permuting, coordinate-wise, the nodal labeling elements—will be shown to be the vital unifying operations that facilitate the extensional character of the N-dimensional hypercube generating system.

Figure 5:
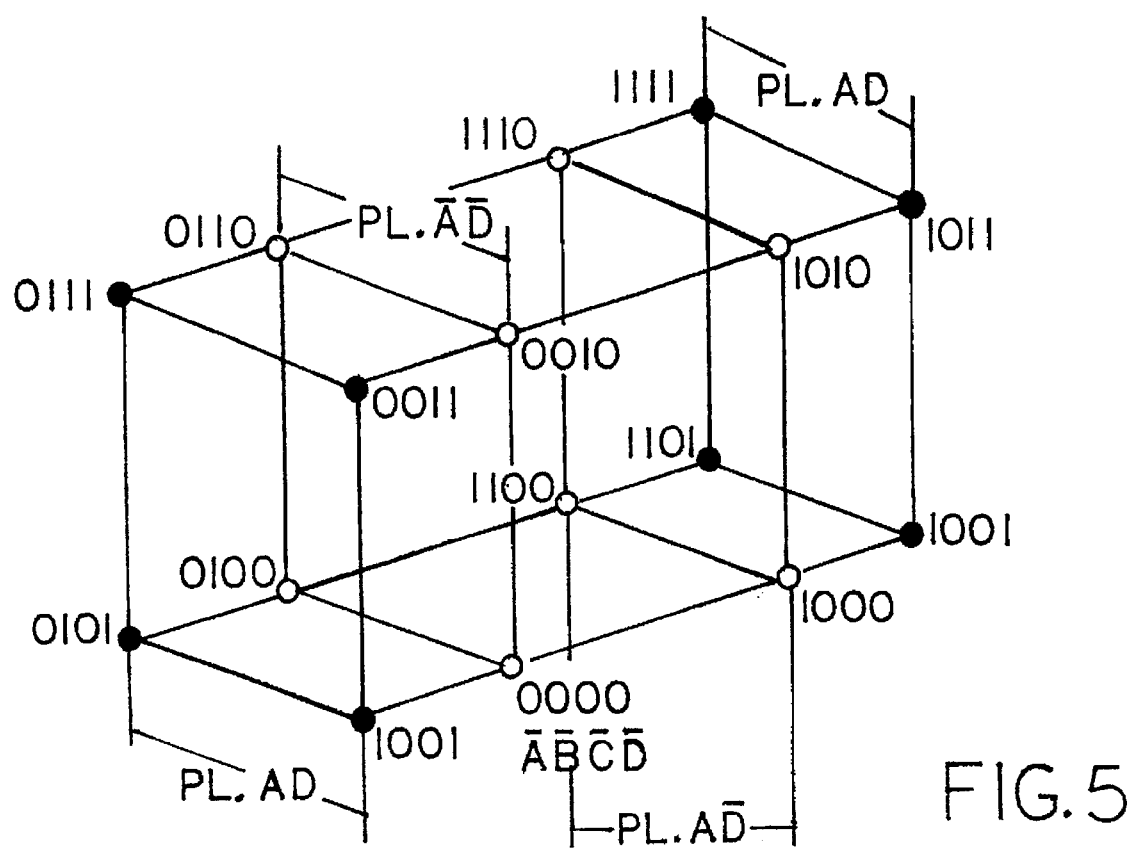
FIG. 5 is a perspective view of the 4-dimensional "cubical core" hypercube.

At this point, another important detail of N-dimensional hypercube generation according to the preferred embodiment of present invention is revealed. The hypercube structure expansion process occurs in three steps. This is accomplished by developing composite cubical hypercubes at each of the eight nodes of the basic referenced original cube. In other words, the progression from the original 3-dimensional hypercube through the 4, 5, and 6-dimensional hypercube results from performing the expansion operations in the following detailed manner:

The 4-dimensional hypercube of FIG. 5 is the first step in the development of the 6-dimensional "cubical core" hypercube shown in FIG. 11. In the 6-dimensional hypercube model eight cubic structures are shown (FIG. 11) as being contiguous to the original cube. The central 3-dimensional hypercube is noted in dotted-line reference only (FIG. 11) and is not to be construed as being actually attached to the eight expansional hypercubes.

Figure 7A:
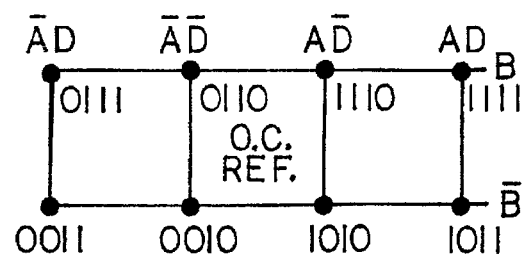
FIG. 7 is a Top View and Front View of the "cubical core" 4-dimension hypercube structure.
Figure 7B:
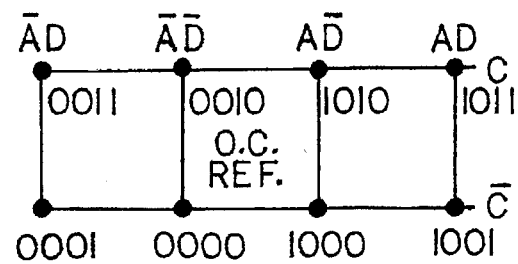
Figure 6:
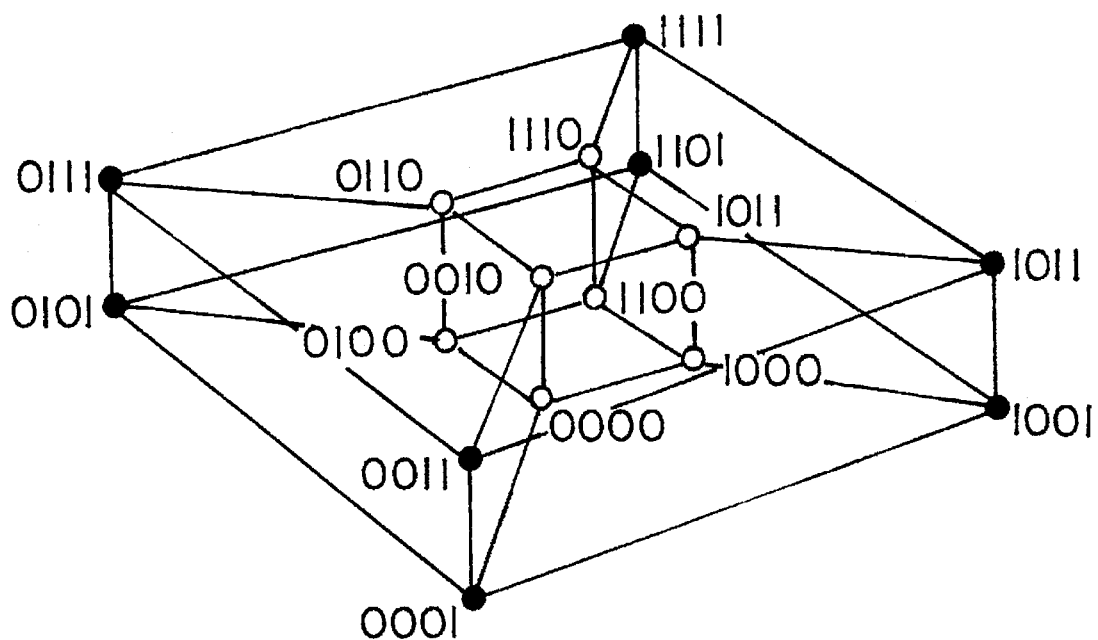
FIG. 6 is a perspective view of the 4-dimensional "incidence-preserving" hypercube structure.

Returning to FIG. 5, generation of the second plurality of nodes from the corresponding first plurality of the basic (N−1) hypercube, the cube, proceeds (by adding a 0 binary digit) as follows: 0000, 1000, 0100, 1100, 0010, 1010, 0110, and 1110. Also at the 1 endpoint of the eight expansion hypercubes of the second plurality of nodes from the corresponding first plurality are generated; 0001, 1001, 0101, 1101, 0011, 1011, 0111 and 1111. Obviously, the fourth member of these nodal element sequences could alternatively carry the labels 0=DNOT and 1=D. Also, as shown in FIG. 7, the partition/coordinate procedure is applied to the Top View and Front view of the 4-dimensional "cubical core" hypercube of FIG. 5. In addition, the technique of permutation of the nodal elements to determine connections, coordinates-wise, affirm the incidence relations as called out in the 4-dimensional "incidence-preserving" hypercube of FIG. 6.

It is clear, again, that the two 3-dimensional (N−1) hypercubes, one at the 0 endpoint and the other at the 1 endpoint of the applied 1-dimension extension hypercubes together generate the 4-dimension (N) hypercube when properly joined in closed loop fashion as recommended previously.

Figure 8:
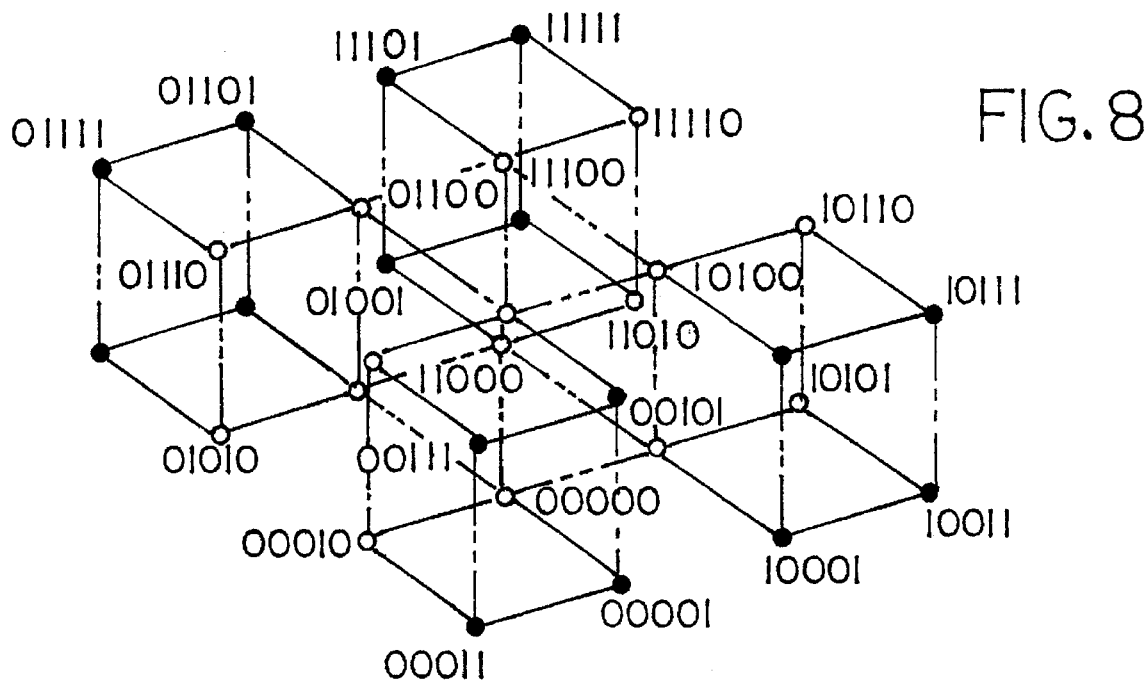
FIG. 8 is the perspective view of the 5-dimension cubical core hypercube structure.

Referring to FIG. 8, the 4-dimension (N−1) hypercube is the (N−1) first plurality of nodes (shown as not-filled-in circles) to which 0 endpoints (as fifth digits of the binary-digit names of nodes) of the 1-dimensional extension hypercubes are applied and generate the first plurality of nodes consisting of 00000, 10000, 01000, 11000, 00100, 10100 01100, 11100; 00010, 10010, 01010, 11010, 00110, 10110, 01110 and 11110. Likewise, at the 1-endpoint of the extension hypercubes are generated the second plurality of nodes as follows; 00001, 10001, 01001, 11001, 00101, 10101, 01101, 11101; 00011, 10011, 01011, 11011, 00111, 10111, 01111 and 11111.

The generated 5 dimension (N) hypercube of FIG. 8 clearly forms rectangles at the eight referenced nodes of the basic 3-dimension "cubical core" hypercube. As stated previously, the 5-dimension hypercube is the second step toward the 6-dimensional "cubical core" hypercube of FIG. 11.

Figure 9A:
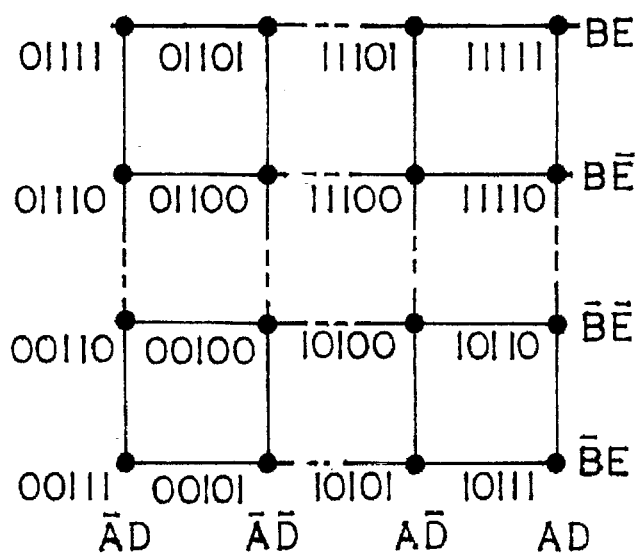
FIG. 9 is the Top View and Side View of the 5-dimension hypercube.
Figure 9B:
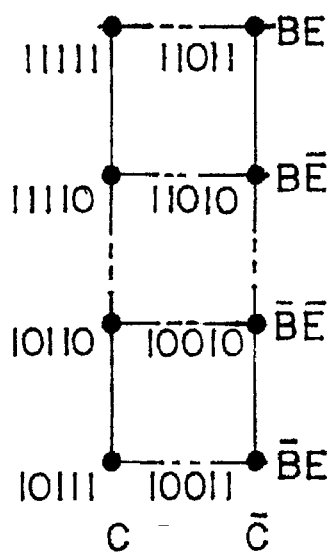

In addition, the partition/coordinate procedure is shown applied in the Top View and Side View of FIG. 9 for the 5-dimension hypercube of FIG. 8.

Figure 10:
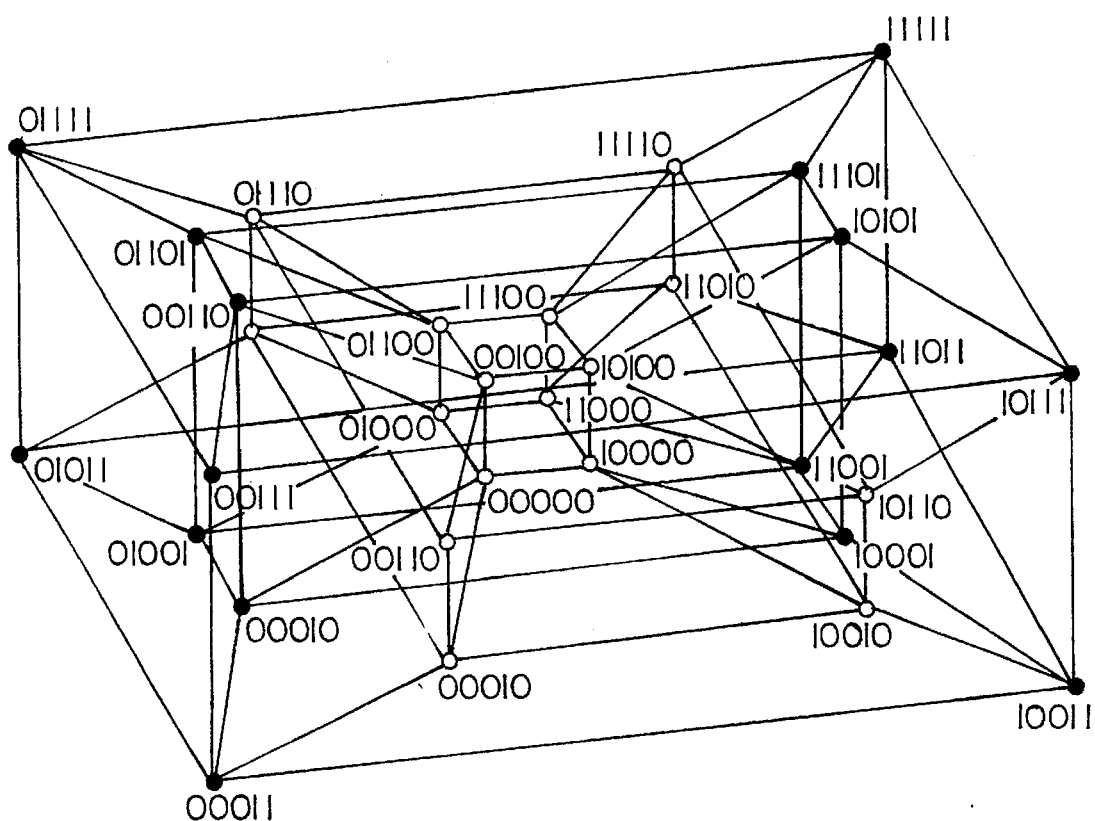
FIG. 10 is the perspective view of the 5-dimension incidence preserving hypercube structure.
Figure 11B:
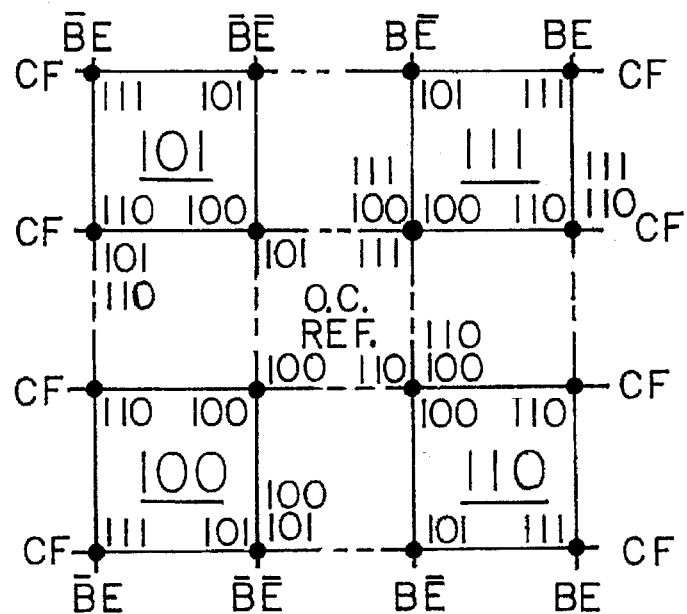
FIG. 11 is the perspective view of the 6-dimension cubical core hypercube structure. Included, also, are its Top View, Front View and End View—right Side.
Figure 11A:
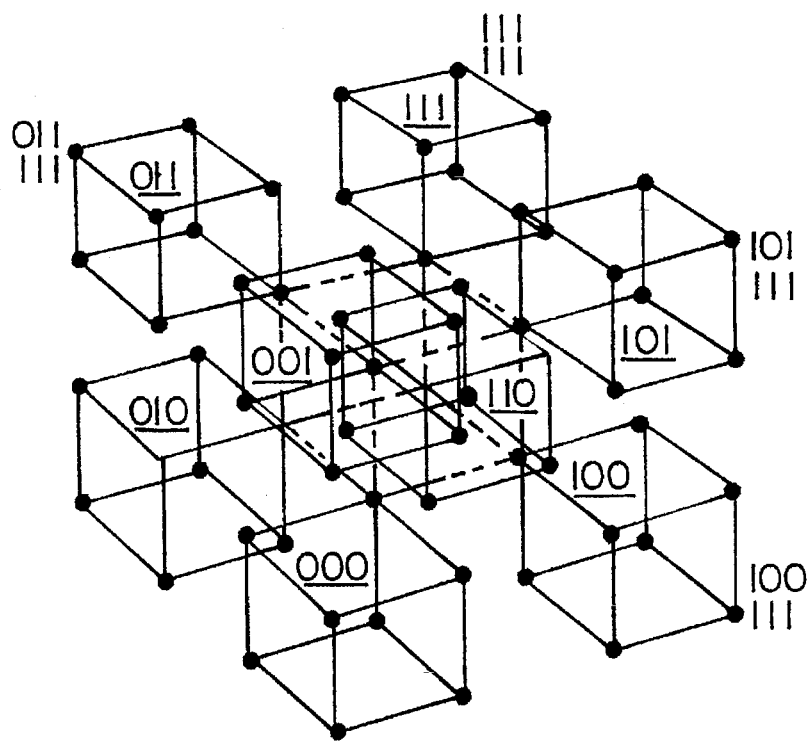
Figure 11C:
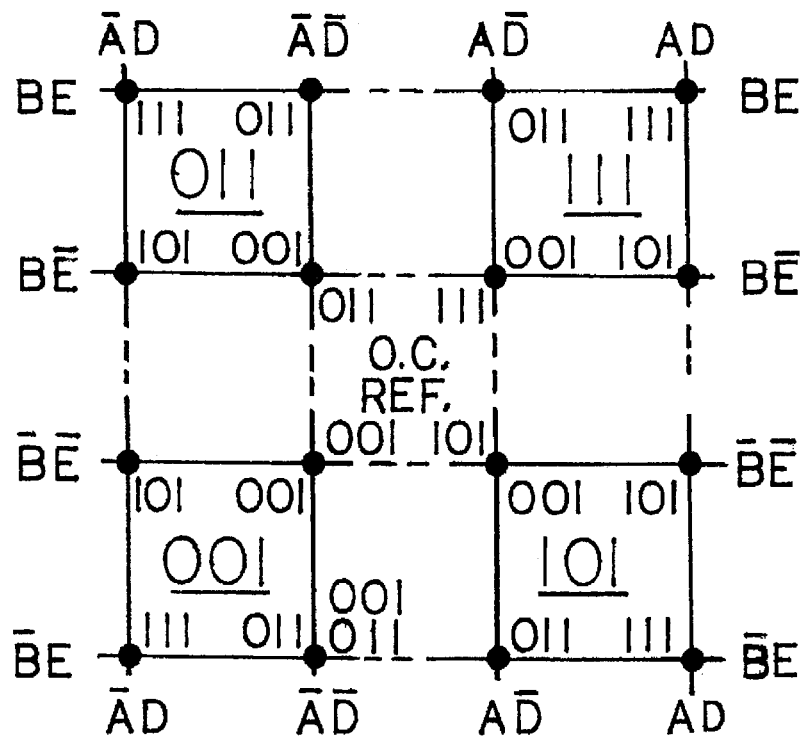
Figure 11D:
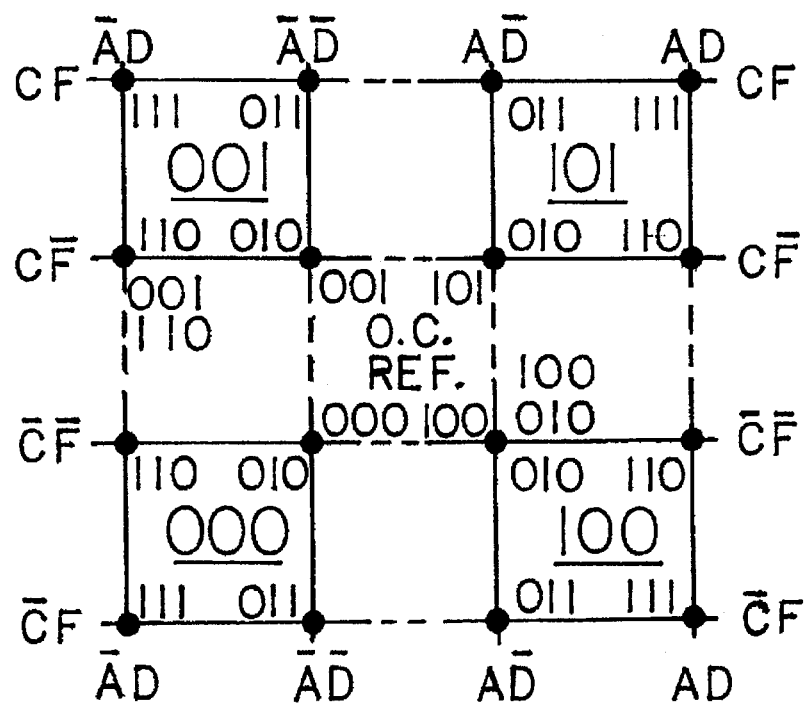
Figure 12:
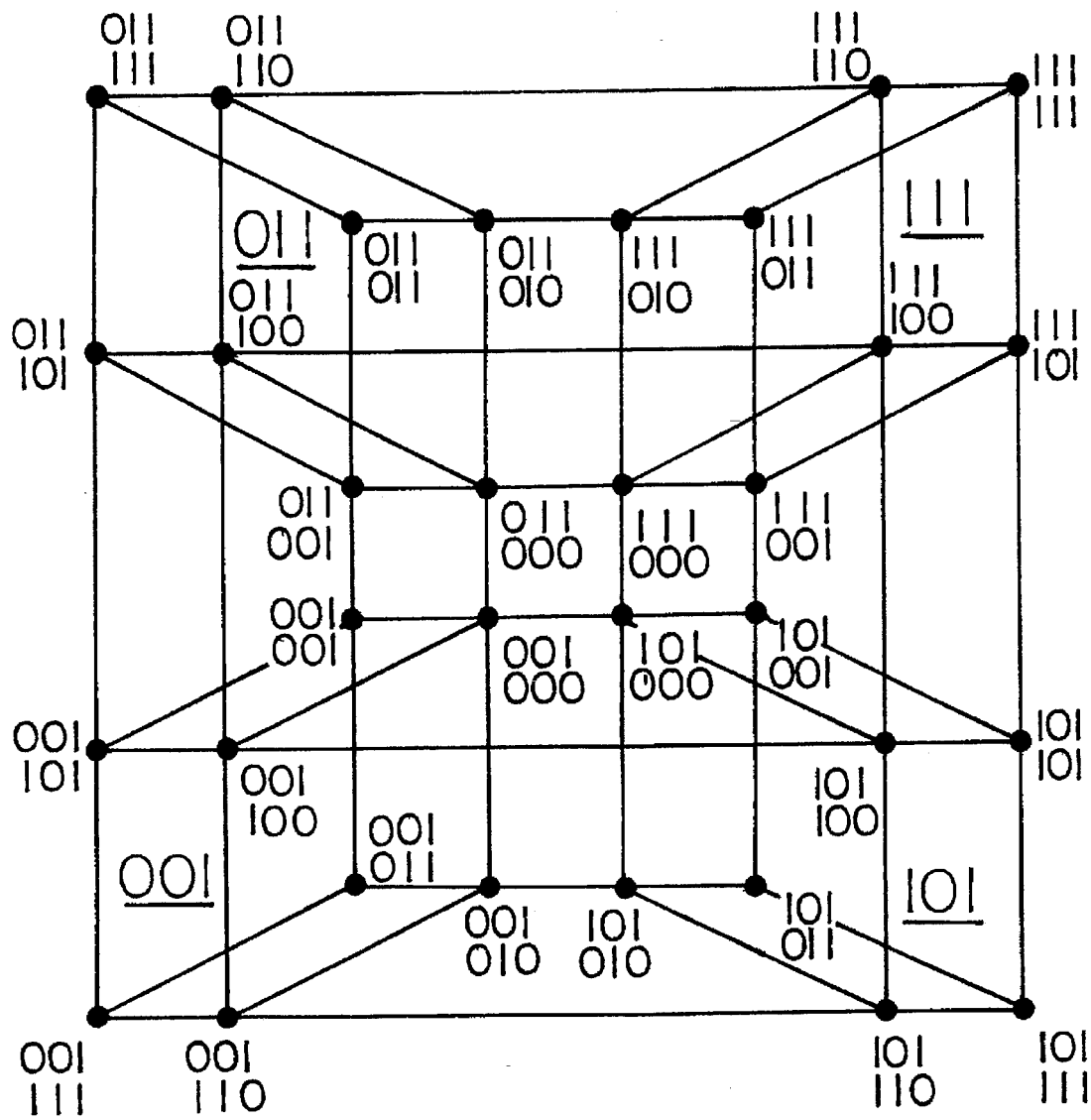
FIG. 12 is the Top View of the upper half of the 6-dimension incidence-preserving hypercube structure.
Figure 13:
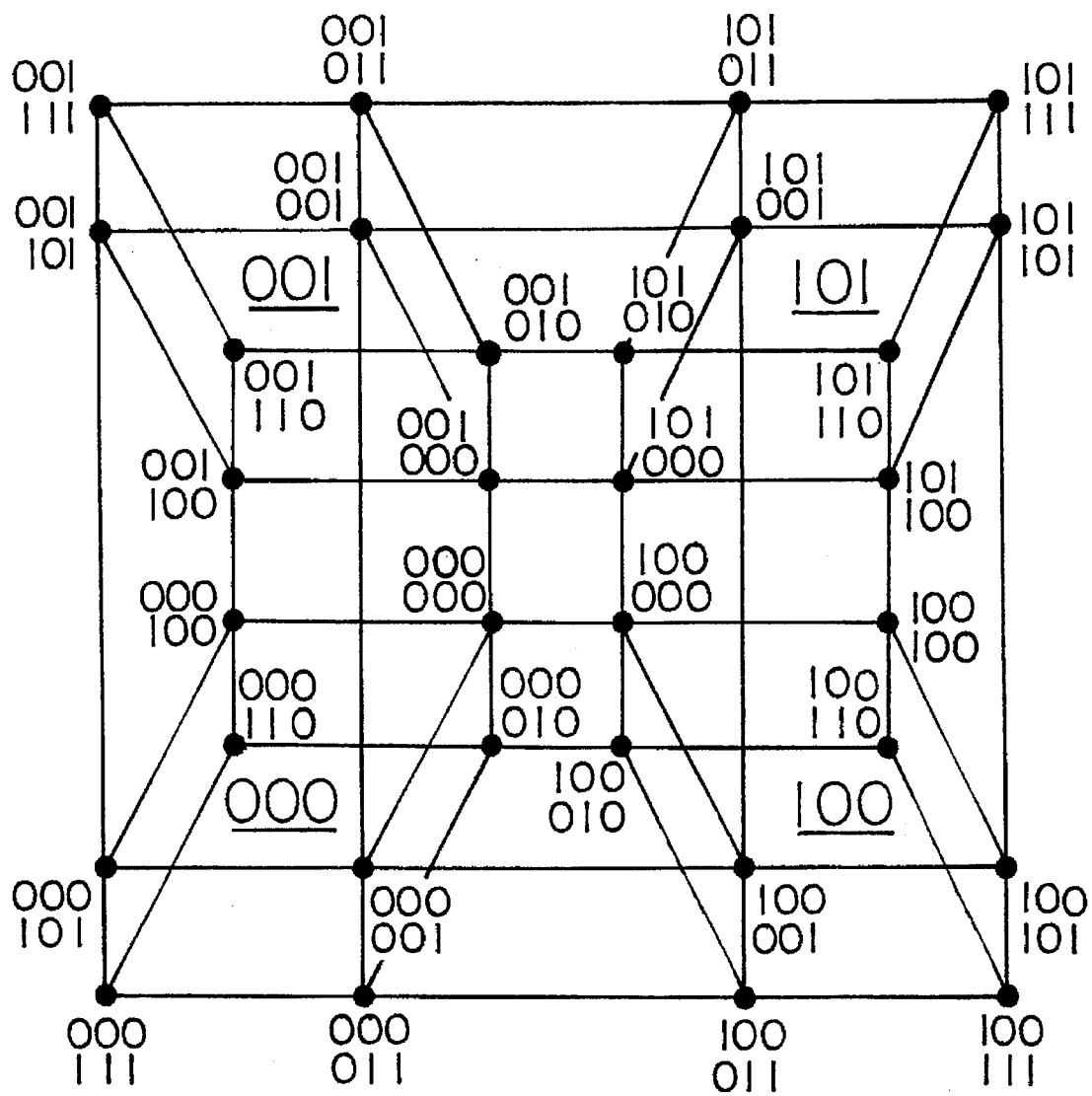
FIG. 13 is the Front View of the 6-dimension incidence-preserving hypercube structure.
Figure 14:
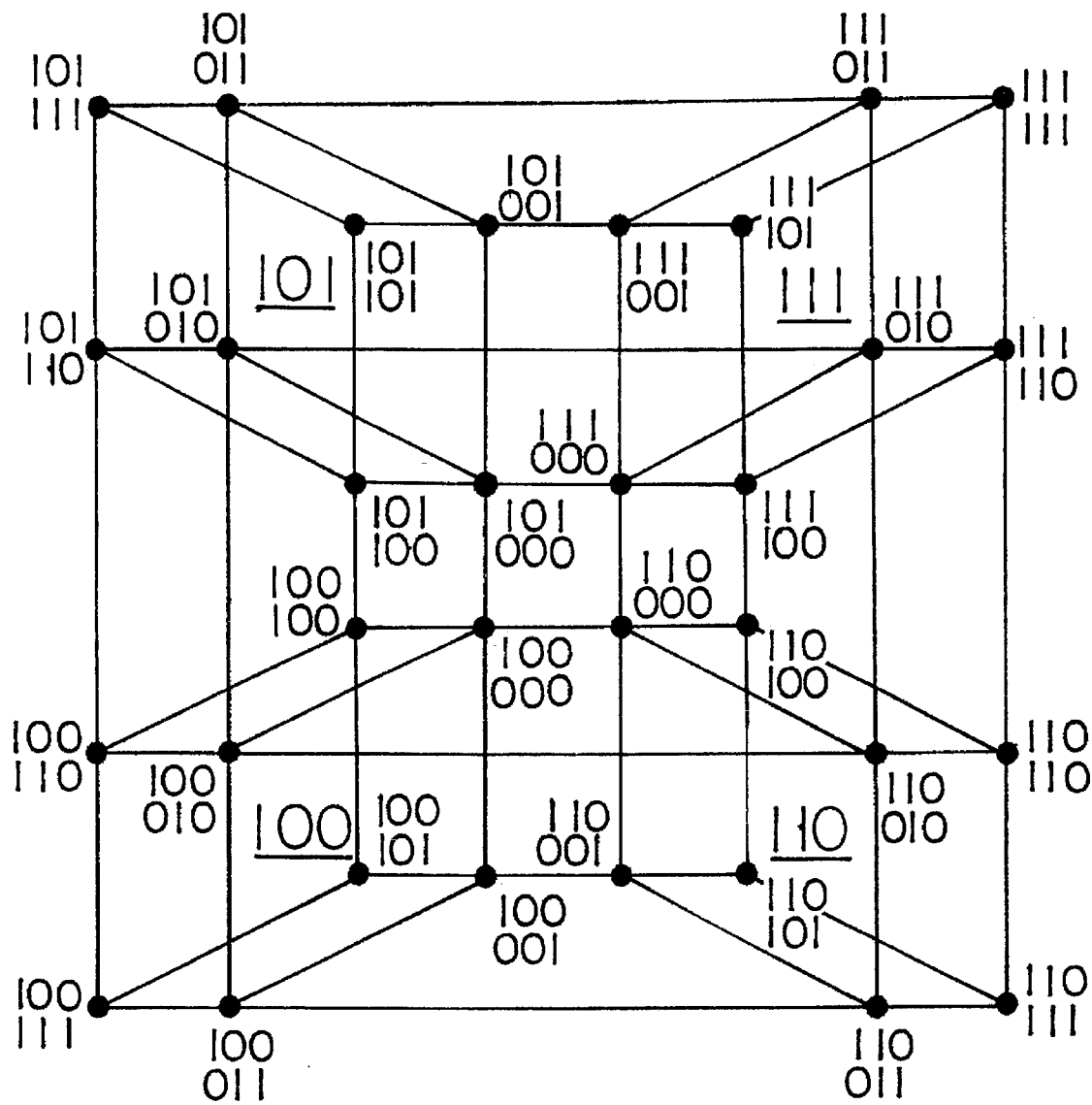
FIG. 14 is the End View—right side of the 6-dimension incidence-preserving hypercube structure.

FIG. 10 shows the incidence-preserving 5-dimension hypercube network, with a portion of the nodes (e.g., computer systems) referenced to show the coordinate-wise permutation of the nodal sequences used to identify the nodal connections shown. Again, from this Figure, it is clear that the 2 (N–1) 4-dimension hypercubes (one shown with open-circle nodes and one with closed-circle nodes) have generated the 5-dimension hypercube as required.

Referring now to FIG. 11, the 6-dimensional "cubical core" hypercube is shown. This is the final stage of the evolving cubic structure generated at the eight nodes of the original 3-dimension referenced hypercube. The cubic substructures have been obtained from the progressive evolution through the 4-dimension linear extension format, then through the 5-dimension rectangular extension, finally being completed with the full 6-dimensional cubic extension.

Figure 15:
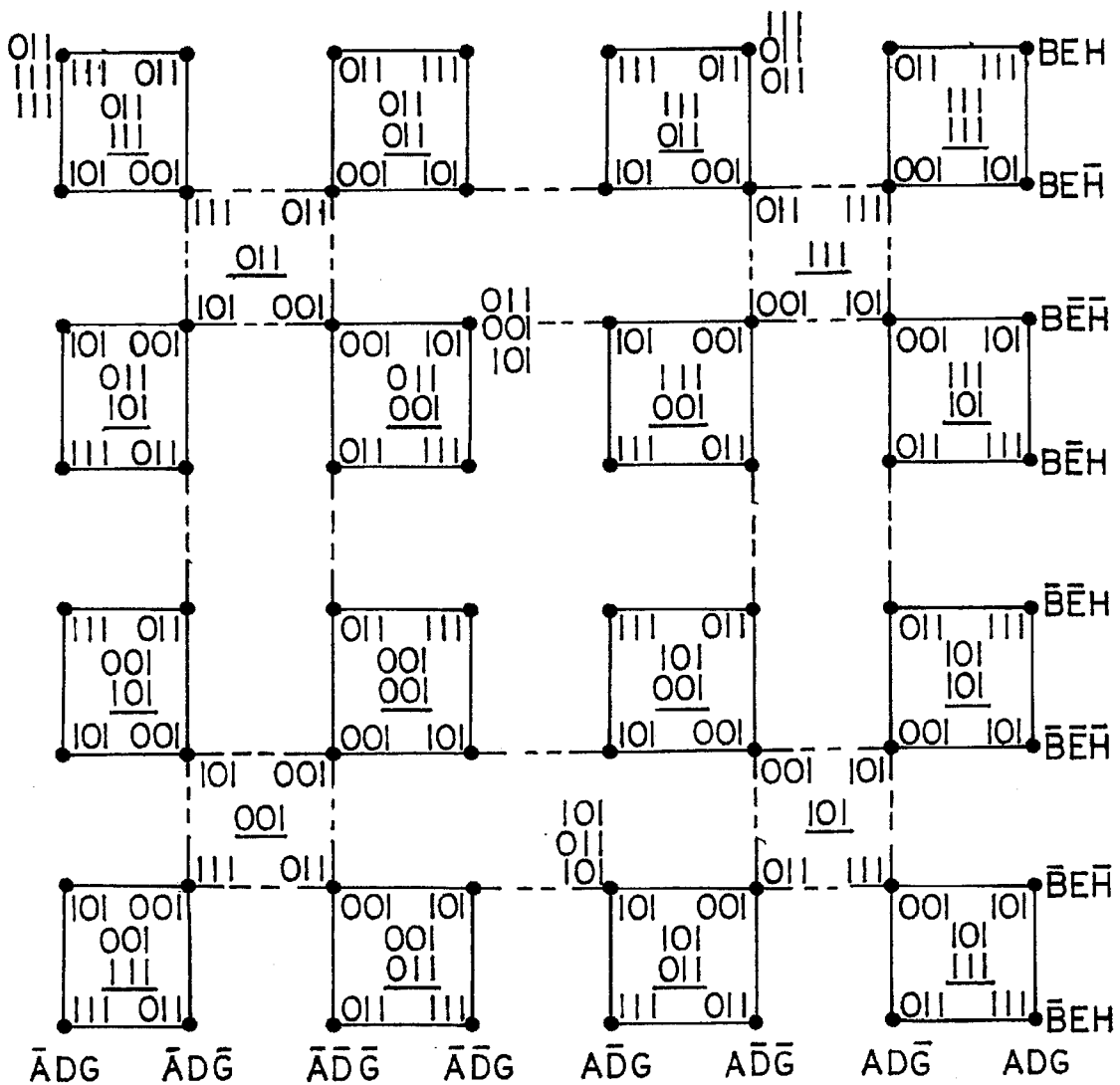
FIG. 15 is the Top View of the cubical core 9-dimension hypercube structure.
Figure 16:
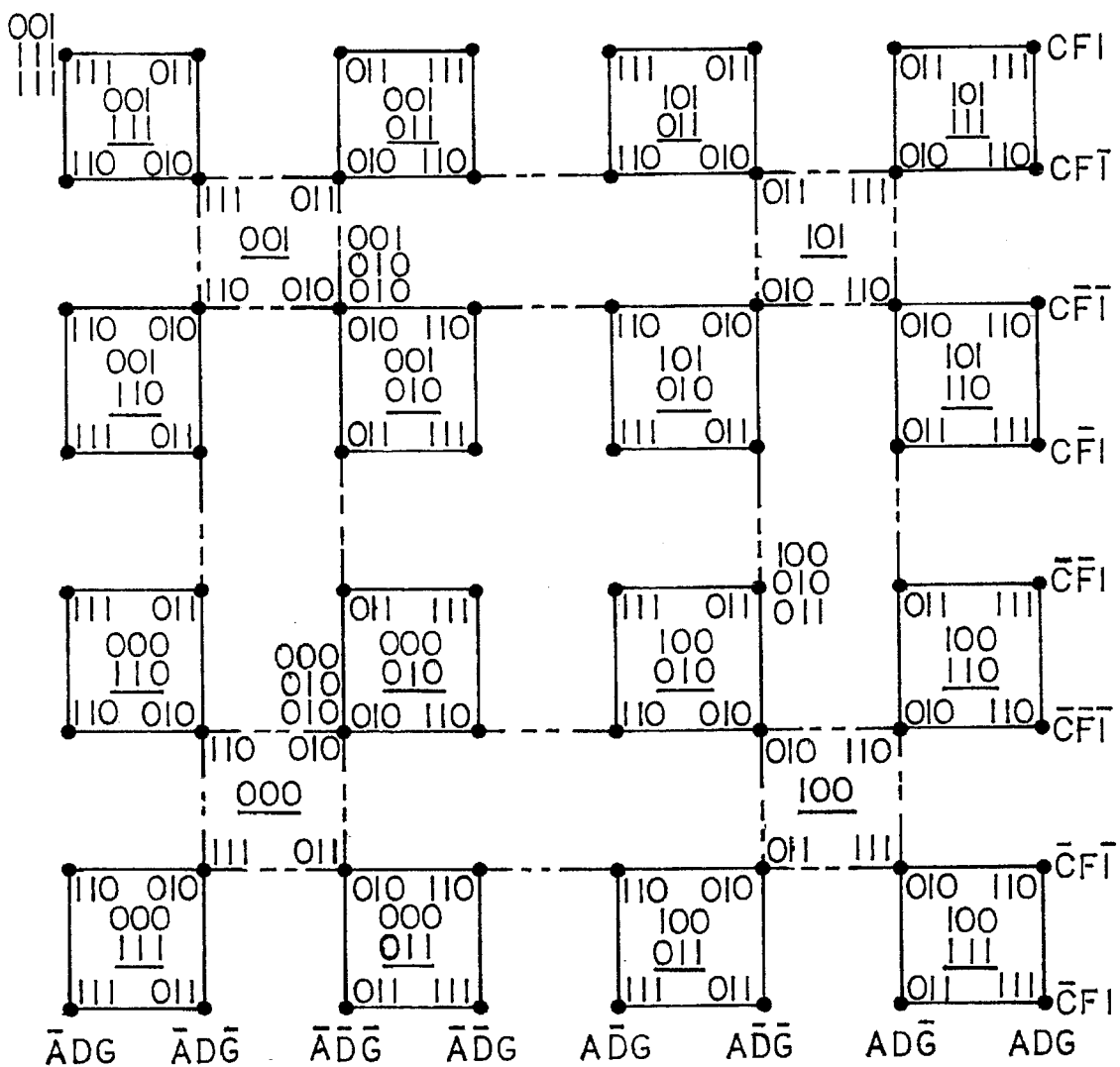
FIG. 16 is the Front View of the 9-dimension cubical core hypercube structure.
Figure 4:
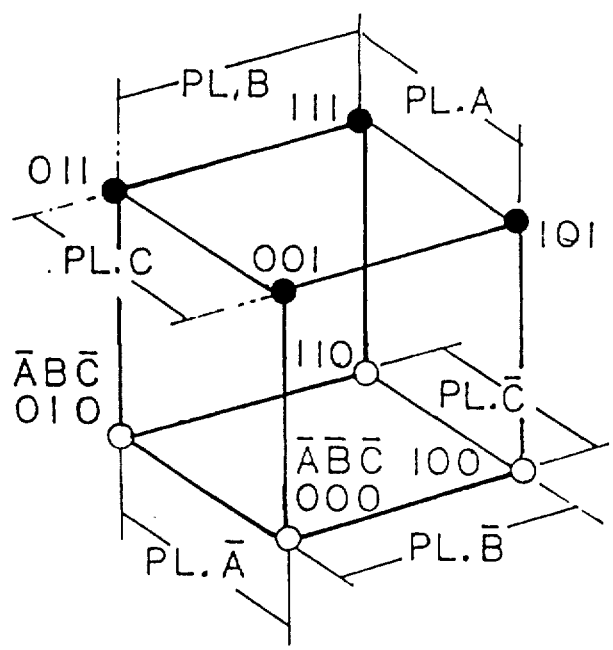

This method, as previously indicated, will form the consistent general pattern of progressive N-dimensional binary space hypercube generation. In fact the 9-dimension "cubical core" models of FIG. 15 (Top View) and FIG. 16 (Front View) are also included to again confirm the method and to show how the partition/coordinate procedure has been designed.

Each cubic complex has been identified and located, and each node in the space carries its particular coordinate reference as well as the system of internal node labeling and placement technique. The format is digital (0,1) and sequences are of ordinal type wherein the first coordinate represents ANOT or A, the second BNOT or B, and the third CNOT or C—NNot or N. It is to be noted, carefully, that the referenced core cubes are the eight original cubes that combined to form the 6-dimension cubical core hypercube. Their space location relative to each other has been preserved and the eight new sets of cubes generated on each cube of this eight cube core foundation form the required 9-dimension "cubical core" hypercube.

Furthermore, the digital sequences of ordinal type that represent the binary space dimension are shown arranged in tiers of three elements. As an example, the 9-dimension array (010010110) appears as

```
010
010
110
```

This labeling technique maintains the fundamental binary space cubic characteristic. In the first tier is the possible 6 place partition; ANOT or A, BNOT or B and CNOT or C. This will generally be the primary first-order partition of the binary space. The 4-, 5- and 6-dimensions subspaces are representative of the possible further six-part partition of DNOT or D, ENOT or E and FNOT or F. Finally the 7-, 8- and 9-dimension subspaces, GNOT or G, HNOT or H, and INOT or I are consequently located in the third tier of elements.

There remains another important characteristic of the three element tiering format which is; the first column is composed of ANOT or A occupying the first place in the first row, DNOT or D, the first place in the second row and GNOT or G occupying the first place in the third row. Our method is designed to operate as follows; the first row primary partition of ANOT or A, BNOT or B, CNOT or C will include all subspaces following in the tiered array. This means that ANOT or A will include as subspaces that of DNOT or D, GNOT or G, JNOT or J—in an (N+3) sequence. The same will apply to the BNOT or B primary partition which will include ENOT or E HNOT or H and KNOT or K—in its (N+3) sequence format. The same reasoning applies also to the CNOT or C primary partition including the FNOT or F, INOT or I and LNOT or L, —(N+3) sequence format. It is to be expected that the alphabetical ordering will expire after the Z letter is used. However, that letter represents the 26 dimension hypercube, which is 2 raised to exponent 26 resulting in 67,108,864 nodes.

The preferred method of generating an N-dimension "cubical core" structure and the corresponding "incidence-preserving" model of the instant hypercube design has been fully disclosed. Accordingly, there are several significant uses for both the method and the hypercube structures produced therefrom. For example, the teaching of complex high-dimension binary logic space-based subjects will now be assisted greatly by having the N-dimension hypercube models of the present invention at and beyond 6-dimension at disposal of designers and teachers.

An important and further use of the present method of generating N-dimensional hypercube structures is in the information, communication and computer industries. For example, many computer scientists are today attempting to align several hundred or even several thousand processors in a parallel manner in order to increase the computational power of the aggregate system. The primary problem is how to connect the component assembly into a compatible whole that respects and maintains the incidence relations pertinent to the logic space under consideration. It is only in doing so that minimum-complexity models can exist and thus eliminate the risk of duplication errors and malfunctions inherent in redundant logic circuit synthesis. Obviously, it would prove highly impractical and inefficient to take thousands of computers and have each one directly connected to every one of the remaining components.

In view of the above, it is believed that the present preferred method of generating N-dimension hypercube structures is particularly well suited for adaptational use in such situations. It will prove to be a powerful as well as accurate design tool to be used in logic-oriented system synthesis.

Another area of use is, at this time, less developed. It is clear that the N-dimension hypercube structure, being binary logic based, possesses the properties of being a partially ordered system, mathematically, a lattice. Also, the 1-dimensional extension hypercubes are also capable of assuming the mathematical properties of the real line segment 0–1. Together, the combined system as herein disclosed can be viewed as being a semi-ordered linear lattice. Mathematically, use of this inventive design may yield many interesting fields of learning and consequently productive systems.

Lastly, while this invention has been particularly shown and described with reference to the preferred embodiments thereof, it will be understood by those skilled in the art, that the foregoing and other changes in form and detail may be made therein without departing from the spirit and scope of the invention.

What is claimed is:

1. A method for generating a fourth and higher multi-dimensional hypercube topology for multiprocessor computer systems comprising, in combination, at least one pair of hypercubes connected together comprising: providing an inner hypercube having a top plane, a bottom plane parallel to said top plane and spaced apart from said top plane by a certain selected distance and providing an outer hypercube having a top plane in the same plane as the top plane of said inner hypercube and a bottom plane in the same plane as the bottom plane of said inner hypercube, said top plane of said outer hypercube and said bottom plane of said outer hypercube being spaced apart by said certain selected distance, said inner hypercube having a first pair of opposed sides parallel to each other and a second pair of opposed sides parallel to each other and orthogonal to said first pair of opposed sides, said outer hypercube having a first pair of opposed sides parallel to each other and a second pair of opposed sides parallel to each other and orthogonal to said first pair of opposed sides of said outer hypercube, each of said sides of said first pair of opposed sides of said inner hypercube having the same height equal to said certain selected distance as a height of each of said sides of said second pair of opposed sides of said inner hypercube, as a height of each of said sides of said first pair of opposed sides of said outer hypercube, and as a height of each of said sides of said second pair of opposed sides of said outer hypercube.

* * * * *

UNITED STATES PATENT AND TRADEMARK OFFICE
CERTIFICATE OF CORRECTION

PATENT NO. : 5,642,524

DATED : June 24, 1997

INVENTOR(S) : John A. Keeling

It is certified that error appears in the above-identified patent and that said Letters Patent is hereby corrected as shown below:

In the Drawings:

Fig. 4, should be deleted and substitute therefor Fig. 4, as shown on the attached page.

Signed and Sealed this

Twenty-eighth Day of October, 1997

Attest:

BRUCE LEHMAN

Attesting Officer

Commissioner of Patents and Trademarks